United States Patent [19]
Chan et al.

[11] Patent Number: 5,506,771
[45] Date of Patent: Apr. 9, 1996

[54] START GEAR RATIO CONTROL SYSTEM AND METHOD

[75] Inventors: Kwok W. Chan, Chorley, England; William J. Mack, Clarkston, Mich.

[73] Assignee: Eaton Corporation, Cleveland, Ohio

[21] Appl. No.: 935,937

[22] Filed: Aug. 27, 1992

[51] Int. Cl.$^6$ .............................. G06F 19/00; G06F 7/70; F16H 59/48
[52] U.S. Cl. ...................... 364/424.1; 364/424.01; 364/431.07; 477/904; 477/120; 477/78; 477/124; 74/335; 74/336 R; 74/745; 74/339; 123/339.24; 123/493; 192/4 B; 340/456; 340/462; 340/441
[58] Field of Search .................. 364/424.1, 431.07, 364/431.05, 424.01; 74/866, 867, 872, 858, DIG. 7, 745, 331, 339, 335, 336 R; 192/0.08, 0.076, 0.052, 0.092, 4 B; 340/62, 815.04, 456, 459, 461, 462; 477/904, 78, 120, 144, 70, 124; 123/339.24, 493

[56] References Cited

U.S. PATENT DOCUMENTS

| | | | |
|---|---|---|---|
| 4,648,290 | 3/1987 | Dunkley et al. | 477/78 |
| 4,732,246 | 3/1988 | Tateno et al. | 192/0.052 |
| 4,735,109 | 4/1988 | Richards et al. | 74/745 |
| 4,754,665 | 7/1988 | Vandervoort | 74/745 |
| 4,800,360 | 1/1989 | Dunkley et al. | 340/456 |
| 4,841,447 | 6/1989 | Hayashi et al. | 364/431.07 |
| 4,888,577 | 12/1989 | Dunkley et al. | 340/461 |
| 4,930,078 | 5/1990 | Dunkley et al. | 364/424.1 |
| 4,930,081 | 5/1990 | Dunkley et al. | 364/424.1 |
| 4,937,749 | 6/1990 | Dunkley et al. | 364/424.1 |
| 5,081,588 | 1/1992 | Holmes et al. | 364/424.1 |

FOREIGN PATENT DOCUMENTS

| | | |
|---|---|---|
| 0269942 | 6/1988 | European Pat. Off. |
| 0271617 | 6/1988 | European Pat. Off. |
| 0517420 | 12/1992 | European Pat. Off. |

*Primary Examiner*—Kevin J. Teska
*Assistant Examiner*—Jacques H. Louis-Jacques
*Attorney, Agent, or Firm*—Howard D. Gordon

[57] ABSTRACT

A control system and method for a semi-automatic mechanical transmission system (10) is provided for allowing operator request for a direct downshift or upshift into a preselected start ratio, under certain predefined conditions. The preselected start ratio is that ratio actually utilized in the immediately preceding vehicle start from stop operation.

4 Claims, 4 Drawing Sheets

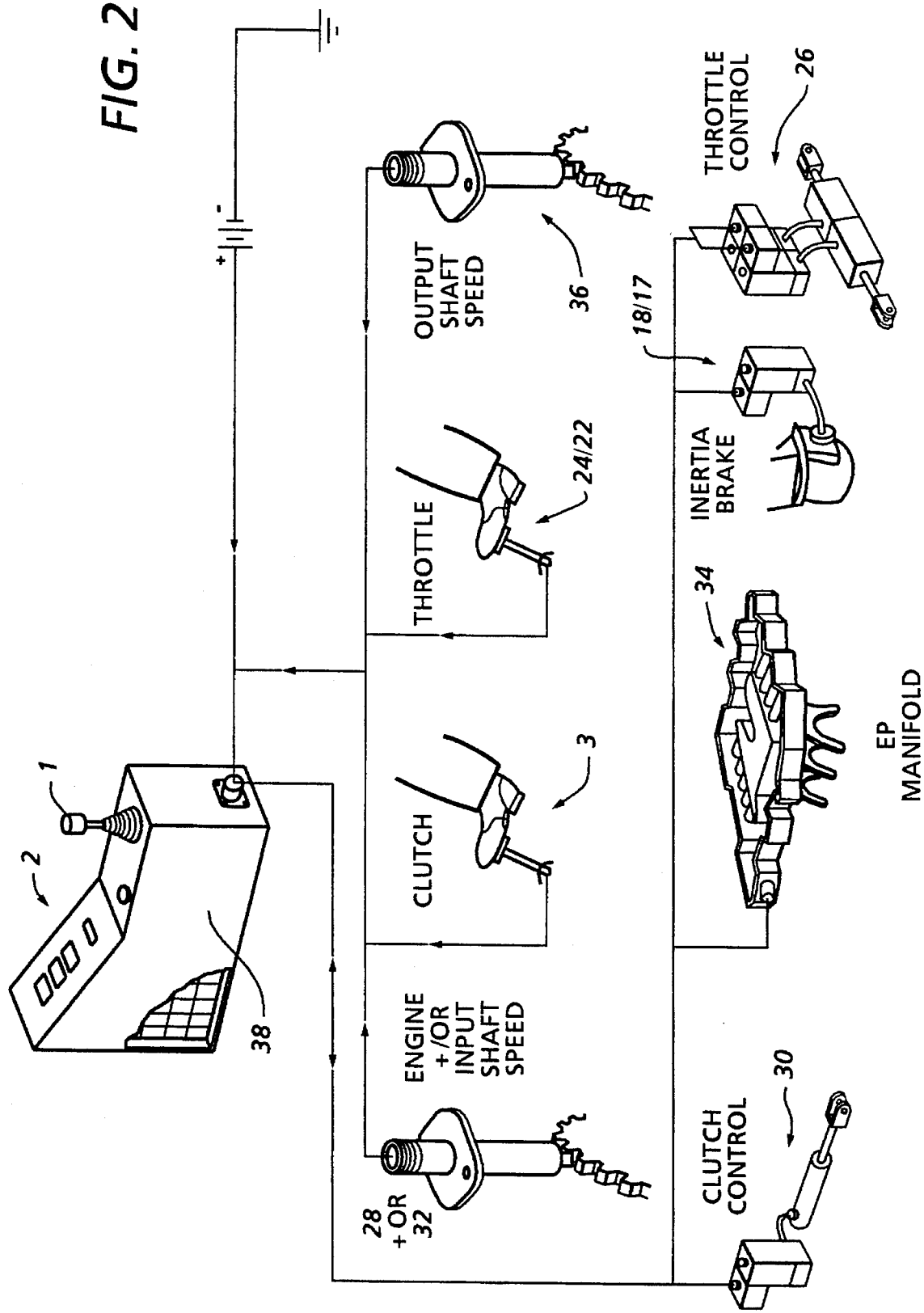

5,506,771

START GEAR RATIO CONTROL SYSTEM AND METHOD

BACKGROUND OF THE INVENTION

Related Applications

The present application is related to patent applications GB9218273.2, titled SCROLLING GEAR RATIO SELECTION CONTROL SYSTEM AND METHOD; GB9218274.0 titled START RATIO SELECTION CONTROL SYSTEM AND METHOD; and GB9218254.2 titled START RATIO ENGAGEMENT SYSTEM AND METHOD, all assigned to the assignee of this application, Eaton Corporation, and all filed the same day as this application, Aug. 27, 1993.

Field of the Invention

The present invention relates to a control system and method for a semi-automatic mechanical transmission system, including a manually operated shift selector, for automatically controlling the changing or shifting of transmission gear ratios on a vehicle, while leaving the vehicle driver or operator some residual measure of control. In particular, the present invention relates to a control system and method for the semi-automatic control of a mechanical change gear transmission including means for automatically executing automatically determined and displayed allowable driver selected transmission ratio shifts, including automatic control of the vehicle master clutch. In one embodiment a clutch pedal is provided and the master clutch operation is automated in all but start from stop situations. More particularly, the present invention relates to a system and method for controlling a semi-automatic mechanical transmission wherein various operator actions and/or system conditions, such as for example, a single downshift request made at a time when the vehicle is at rest, the master clutch is disengaged and the transmission is engaged in a relatively high (non start) ratio and/or a single upshift request made at a time when the vehicle is at rest, the master clutch is disengaged and the transmission is in transmission neutral, are interpreted as a request for a direct shift into a preselected start ratio.

More particularly yet, the present invention relates to fully or partially automated mechanical transmission system having a plurality of available start from stop ratios and at least one mode to shift directly into a preselected start ratio wherein the preselected start ratio is the ratio actually used by the operator in the immediately preceding vehicle start from stop operation.

Description of the Prior Art

Fully automatic transmission systems, both for heavy-duty vehicles such as heavy-duty trucks and/or coaches, and for automobiles, that sense throttle openings or positions, vehicle speeds, engine speeds, and the like, and automatically shift the vehicle transmission in accordance therewith are well known in the prior art. Such fully automatic change gear transmissions include transmissions wherein pressurized fluid is utilized to frictionally engage one or more members to other members or to a ground to achieve a selected gear ratio and automated mechanical transmissions utilizing electronic, hydraulic and/or pneumatic logic and actuators to engage and disengage mechanical (i.e. positive) clutches to achieve a desired gear ratio. Examples of such transmissions may be seen by reference to U.S. Pat. Nos. 3,961,546; 4,081,065; 4,361,060; 5,050,079 and 5,109,729, the disclosures of which are hereby incorporated by reference.

Such fully automatic change gear transmissions can be unacceptably expensive, particularly for the largest heavy-duty vehicles which are not typically sold in high volumes. Additionally, those automatic change gear transmissions utilizing pressurized fluid and/or torque converters tend to be relatively inefficient in terms of power dissipated between the input and output shafts thereof. Moreover, many vehicle operators like to control the selection of the gear ratios, particularly since they can see and/or know the nature of the road ahead and/or of the load being carried.

The above drawbacks have been minimized by providing a semi-automatic mechanical transmission control wherein automatic changing between a plurality of gear ratios is provided while normally permitting the driver to choose when to make a particular gear ratio change and whether to select the immediately consecutive ratio up or down or to skip one or more ratios. Furthermore, the semi-automatic control system prohibits engagement of a driver selected higher ratio, i.e. an upshift, that would cause the engine speed to decrease below the idle speed, i.e. would cause stalling and/or over-stressing at low speeds of the engine, and of a lower ratio, i.e. a downshift, if such a change would cause over-speeding of the engine. It is noted that with manual mechanical transmissions such over-speeding of the engine can occur due to a improper downshift even though the engine speed may be governed against accelerating above the governed engine RPM. Examples of such a semi-automatic transmission control can be seen by reference to U.S. Pat. Nos. 4,648,290; 4,800,360; 4,930,081 and 4,930,078, the disclosures of which are incorporated herein by reference.

While the above-described semi-automatic mechanical transmission control does provide a very desirable semi-automatic control, the control was subject to improvement as, if the driver or operator desired a shift into a selected transmission start ratio while the vehicle was at rest, the driver was required to identify the currently engaged ratio, to calculate the number of steps from the currently engaged ratio to the selected start ratio and to then move the selector lever that number of times in the upshift downshift direction. This was particularly a concern in modern mechanical transmissions for heavy-duty vehicles which may have 9, 10, 12, 13, 16 or 18 forward speed ratios and wherein any one of the first seven ratios may be appropriate start ratios under certain conditions. Examples of such multi-speed mechanical transmissions may be seen by reference to U.S. Pat. Nos. 4,735,109 and 4,754,665, the disclosures of which are incorporated herein by reference.

The drawbacks of the prior art semi-automatic mechanical transmission control have been minimized by the provision of controls and control methods wherein the control unit will interpret various combinations of vehicle conditions and operator actions as a request for a downshift or upshift directly into a selected start ratio. If the vehicle operator was not satisfied with the default ratio, the operator could then shift from the preselected ratio into any allowable start from stop ratio.

While these controls are improvements, these controls are not totally satisfactory as the preselected start ratio may not be the specific ratio desired by the operator in view of desired vehicle performance, vehicle loading, operating terrain, weather conditions and the like.

SUMMARY OF THE INVENTION

In accordance with the present invention, the drawbacks of the prior art are overcome or minimized by the provision of a control system and method for memorizing the last used start from stop gear ratio and for selecting a specific ratio as a predetermined start ratio from a plurality of available start from stop ratios, wherein the selected specific start ratio is that ratio actually utilized for the immediately preceding vehicle start from stop operation.

Accordingly, it is an object of the present invention to provide a new and improved control system/method for semi-automatic mechanical transmission having a control for automatically determining allowable up and down shifts from a given gear ratio, preferably for automatically displaying same, for automatically executing such permissible gear ratio changes upon selector lever manual selection thereof by the vehicle operator, and wherein the operator can request an automatic shift into a selected start ratio, preferably by a single movement of the selector lever, and the selected start ratio is that start ratio actually utilized in the immediately preceding vehicle start from stop operation.

This and other objects and advantages of the present invention will become apparent from a reading of the following description of the preferred embodiments taken in connection with the attached drawings.

BRIEF DESCRIPTION OF THE DRAWINGS

FIG. 2 is a schematic illustration of the control system of the semi-automatic transmission of the present invention.

DESCRIPTION OF THE PREFERRED EMBODIMENT

Figure 1:
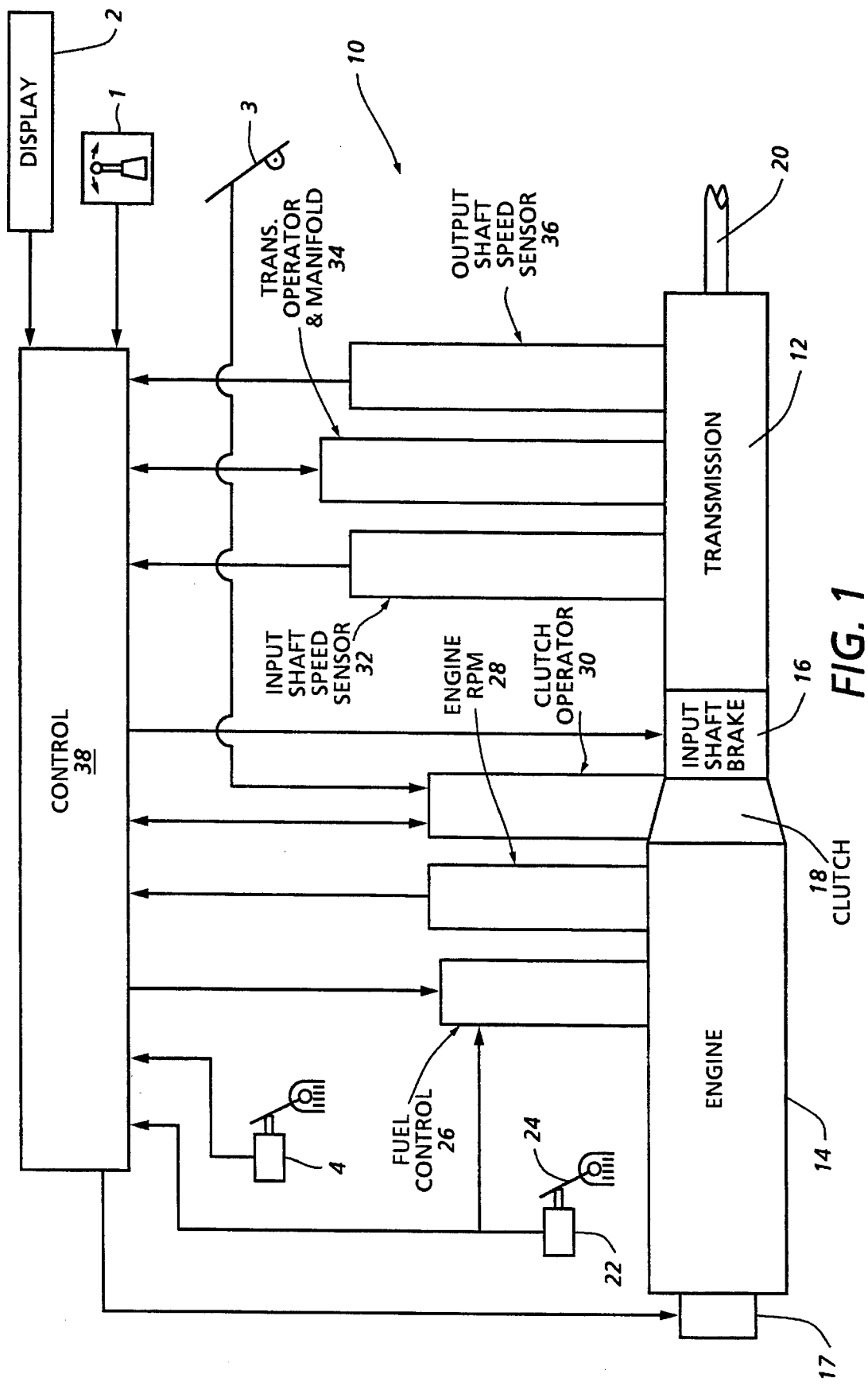
FIG. 1 is a schematic illustration of the semi-automatic mechanical change gear transmission system of the present invention.

In the present description of the preferred embodiment, certain terminology will be used for descriptive purposes only and is not intended to be limiting. The terms "upward", "downward", "rightward" and "leftward" will refer to directions in the drawings to which reference is made. The terms "inward" and "outward", refer to directions towards and away from, respectively, the geometric center of the device, or portion thereof, being described. The above applies to derivatives of the terms above specifically mentioned, and terms of similar import.

The term "simple transmission" is used to designate a change speed transmission, wherein the operator may select one of a plurality of single gear reductions. The term "compound transmission" is used to designate a change speed transmission having a main transmission portion and an auxiliary transmission portion connected in series whereby the selected gear reduction in the main transmission portion may be compounded by further selected gear reduction in the auxiliary transmission portion. The term "splitter type compound transmission" as used herein will designate a compound transmission wherein the auxiliary transmission is used to provide various selectable steps for subdivisions of the gear ratio selected in the main transmission portion. In a splitter type compound transmission, the main transmission section is typically provided with relatively wide steps which are split or subdivided by the auxiliary section. The term "upshift" as used herein, shall mean the shifting from a lower speed gear ratio into a higher speed gear ratio. The term "downshift" as used herein, shall mean the shifting from a higher speed gear ratio to a lower speed gear ratio. The terms "low speed gear", "low gear" and/or "first gear" as used herein, shall all designate the gear ratio utilized for lowest forward speed operation in a transmission or transmission section, i.e., that set of gears having the highest ratio of reduction relative to the input shaft of the transmission.

A "selected direction" of shifting will refer to selection of either single or multiple upshifting or downshifting from a particular gear ratio. The "displacement" between ratios refers to the number of selectable ratios between two given ratios, for example, third speed or gear ratio is displaced by one (1) and two (2) ratios, respectively, from fourth and fifth speed, respectively, in the downshift direction.

The term "blocked transmission" or "blocked transmission section" shall designate a change gear constant mesh transmission or transmission section, wherein a selected one of a plurality of axially moveable gears is nonrotatably coupled to a shaft as a result of axial movement of the selected gear from the neutral to the engaged position thereof, and by means of a resiliently biased positive clutch and a blocker is utilized to prevent such engagement until the members of the positive clutch are at substantially synchronous rotation, such synchronous condition achieved by manual and/or automatic manipulation of the transmission input and/or output shafts to cause a crossing of synchronous condition therebetween, but not typically achieved by frictional contact of the selected clutch members sufficient to cause one of the clutch members, and the apparatus associated therewith, to rotate with the other clutch member. Blocked transmissions and/or transmission sections are illustrated in U.S. Pat. Nos. 3,799,002; 3,924,484; 4,192,196 and 4,440,037, the disclosures of all of which are hereby incorporated by reference.

The present invention is applicable, in principle, to the semi-automatic control of any type of mechanical change gear transmission adaptable for providing output signals to and receiving command signals from electro-pneumatic control devices. However, the semi-automatic control system of the present invention is particularly advantageously applied to a splitter type compound transmission of the type having a non-synchronized, non-blocked main transmission section connected in series with an auxiliary section of the blocked splitter type. Such transmissions are known in the prior art and are referred to as "semi-blocked" transmissions, and are described and illustrated in European Patent Application No. 82303586.2, published Feb. 9, 1983 (EP-A-0071353) and European Patent Application No. 83307061.8, published Sep. 5, 1984 (EP-A-0117342) and U.S. Pat. No. 4,735,109. Transmissions of the type illustrated in above-mentioned U.S. Pat. No. 4,754,665 may be advantageous used in connection with the present invention.

The semi-automatic transmission system to which the present invention is particularly advantageously related, is described an illustrated in European Patent application 85305072.2, published Feb. 5, 1986 (EP-A-0 170 465) and U.S. Pat. No. 4,648,290.

Referring to FIG. 1, the position of a driver-operated throttle 24 is sensed at sensor 22 and fed to a central processing unit 38, which also receives inputs relative to engine speed from sensor 28 and/or transmission input shaft speed from sensor 32, transmission output shaft speed from sensor 36, and positive or negative actuations of the driver's gear shift lever, or "joy stick" 1, to be described in greater detail below. It is understood that transmission output shaft speed is an indication of vehicle ground engine speed is an indication of transmission input shaft speed, and visa versa, especially if clutch 16 is nonslippingly engaged, while transmission output shaft speed is an indication of vehicle speed.

The throttle position sensor 24 may be of the type illustrated in U.S. Pat. No. 4,922,425, the disclosure of which is incorporated by reference, which will indicate the presence or absence of the operator's foot on the throttle pedal as well as displacement of the throttle pedal.

Devices, such as throttle position sensor assembly 22, for sensing the operators setting of a throttle pedal 24, or the like, and providing a signal proportional to, or at least indicative of, the monitored setting, and so called "remote fuel control" or "fly by wire" systems utilizing same, are known in the prior art and illustrated in the U.S. Pat. Nos. 4,250,845; 4,305,359; 4,319,658 and 4,461,254, the disclosures of which are hereby incorporated by reference.

For control of vehicle SAMT systems 10, such as the systems illustrated in above-mentioned U.S. Pat. Nos. 4,648,290; 4,551,802; 4,361,060 and 4,081,065, it is important to provide accurate input signals to central processing unit, or control, 38, indicative of the operator's positioning of the throttle. The setting is usually expressed as a percentage of wide-open or full throttle with the idle position being zero percent (0%) and full or maximum throttle being one hundred percent (100%).

To provide more responsive control of SAMT system 10, and/or to provide at least partial redundance in the throttle position sensor assembly, two additional sensors, the "throttle pedal safety switch" and the "ride through detent switch" are provided.

The throttle pedal safety switch, provides a signal "THPS" which is indicative of the driver's foot on the throttle pedal and greater than engine idle speed fuel required. The ride through detent switch, provides an input signal indicative of a desire for maximum performance. This is often referred to as a "kick-down" signal.

Control logic circuits, sensors, and actuators for the transmission system 10 as disclosed in FIGS. 1 and 2, may be as disclosed in above-mentioned U.S. Pat. Nos. 4,361,060; 4,648,290; 4,930,081 and 4,930,078. Specifically, central processing unit 38 receives inputs, processes same in accordance with predetermined logic rules, and provides command output signals to pneumatic and/or electrical actuators for control of an exhaust brake 17 and/or an input shaft brake 18 for rapid upshifts, and automatic fuel control 26 to "blip" the supply of fuel to the engine 14 to achieve rapid synchronous rotation preparatory to a downshift, clutch control via operator 30, and ratio shifting via transmission operator 34. The transmission operator 34 may also be of the "X-Y" type as illustrated in U.S. Pat. Nos. 4,873,881 and 4,899,607, the disclosures of which are incorporated herein by reference.

The central processing unit also sends command output signals to the display 2 to be described in greater detail below. The semi-automatic transmission system 10 may additionally comprises a usual foot operated manual clutch control 3 intended for use only for start from rest and/or low speed creeping maneuvering situations. The control 38 receives signals indicative of manual clutch control 3 position and of actuation of the vehicle brakes 4. The semi-automatic mechanical transmission system 10 also includes sources of electric and/or pneumatic power (not illustrated).

The central processing unit may be of the type illustrated in U.S. Pat. No. 4,595,986 and may incorporate fault detection and tolerance logic of the type illustrated in U.S. Pat. Nos. 4,849,899; 4,899,279 and 4,945,484, the disclosures of which are incorporated by reference.

As used herein, the term "blip" designates a temporary increase in the supply of fuel to the engine 14, while the term "dip" means a momentary decrease in supply of fuel to the engine. The terms blip and dip are usually associated with automatic controller 38 commanded increases and decreases, respectively, of the supply of fuel to the engine independent of the operator selected position of manual throttle pedal 24.

Figure 3A:
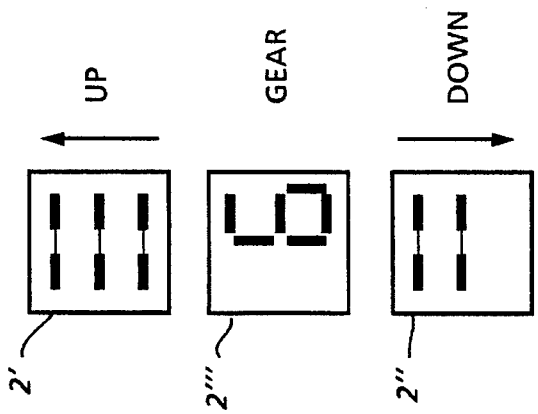
FIG. 3A is an enlarged view of a portion of the display illustrated in FIG. 3.
Figure 3:
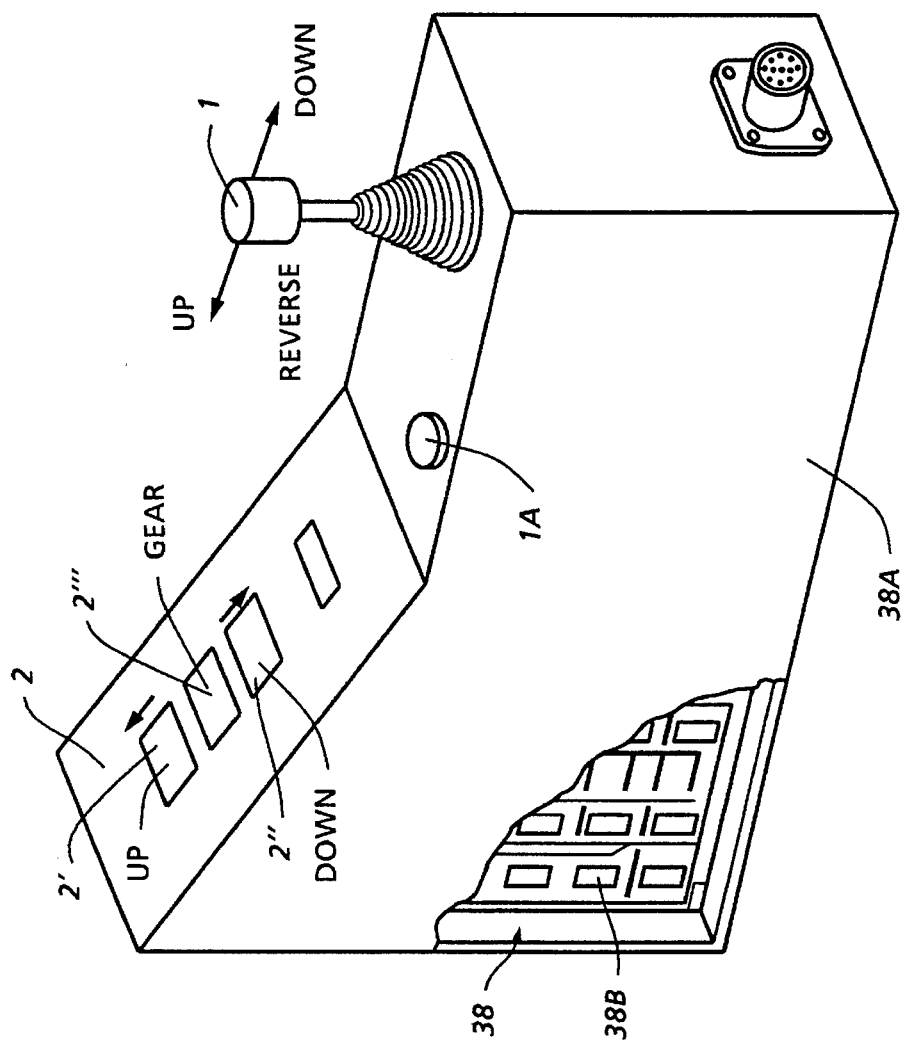
FIG. 3 is a perspective view of the driver's manual shift control and display device.

Preferably, as may be seen by reference to FIG. 3, the central processing unit 38 may be contained in a box or housing 38A, which housing carries the display panel 2 having an upshift indicator display 2', a downshift indicator display 2", and a currently engaged gear ratio display 2''', the shift select lever 1, an optional reverse enable button 1A, as well as a central processing unit electronic circuitry 38B.

The schematics of the control system of the semi-automatic mechanical transmission system 10 are also illustrated in FIG. 2.

Referring to FIG. 3A, the display 2 includes upshift indicator section 2', downshift indicator section 2" and currently engaged gear ratio indicator section 2'''. As illustrated, the currently engaged gear ratio display section 2''' is presently displaying a "6" indicating that the vehicle transmission is operating in sixth (6th) gear. The upshift display section 2' has three lines indicating the maximum number of permissible consecutive upshifts permitted according to the sensed input parameters, such as sensed engine or input shaft speed and sensed output shaft speed as processed according to the predetermined logic rules or program. In the present situation, the three lines indicate that a single, a double or a triple upshift is permissible. Accordingly, the driver may select a permissible shift directly to either seventh (7th), eighth (8th) or ninth (9th) speed. The downshift display 2" section has two lines indicating the maximum number of permissible consecutive downshifts permitted according to the sensed parameters as processed by the predetermined logic or program. In the present situation, the two lines in display 2' indicate that the transmission may be permissibly downshifted to either fifth (5th) or to fourth (4th) gear.

Briefly, the permissibility of a possible upshift or downshift is determined by comparing the expected engine speed at the completion of such an upshift or downshift, assuming a substantially constant vehicle speed or a calculated expected vehicle speed and fully engaged master clutch, to a fixed range of maximum and minimum permissible engine speeds. The central processing unit 38 will not issue command signals to execute a selected impermissible ratio change. Preferably, a central processing unit will execute the closest permissible ratio change to that selected by the operator. By way of example, assuming the conditions indicated by display 2 as illustrated in FIG. 3A, should the operator select a downshift to third gear, such a downshift will not be executed by the central processing unit 38 as being impermissible. However, in the preferred embodiment, the central processing unit 38 will issue command output signals for a double downshift from sixth gear to fourth gear. Not only is an impermissible ratio change refused, but the driver will usually have been advised already by display 2 that the ratio should never have been attempted or selected.

The display 2 provides an indication to the operator what upshifts and downshifts are permissible and as to which upshifts and downshifts are impermissible. Should the driver not heed the warning, the central processing unit 38 will not generate impermissible shift command even though synchronization of the mechanical jaw clutch elements could be obtained by the system.

To shift transmission 12, the driver moves lever 1 forward (for upshifts) and rearward (for downshifts) from the position illustrated in FIGS. 2 and 3. To select a single upshift, i.e. a shift to seventh gear, the operator will move lever 1 forward once and the lever will then return to the neutral or centered position under bias. If, in sixth gear as shown, the operator moves the lever forward three times in quick succession, each allowing its return to rest, he will skip two gears in effect, and achieve a skip shift directly into ninth speed (i.e. seventh and eighth speeds will not be engaged) almost instantaneously. Accordingly, multiple or skip shifts may be commanded by use of the semi-automatic control of the present invention. The declutching of the master clutch 16 and synchronizing of the selected jaw clutch members associated with the selected gear ratio is achieved automatically and rapidly due to automatic throttle and clutch control and braking of the input shaft and/or the engine. The control system is semi-automatic and the driver must exercise his discretion as to when to up or downshift, and as to how many gear ratios to up or downshift, but is not called upon to coordinate gear lever, throttle pedal and clutch actuation. Once the driver has selected a permitted gear ratio, the throttle is blipped to achieve necessary synchronization during a downshift, or dipped for achieving necessary synchronization during an upshift, all of which is done automatically for the driver by the central processing unit 38. The reverse mode of operation may be achieved only from the neutral at rest position and then is achieved by moving control lever 1 backwardly from the currently engaged neutral position. To prevent and inadvertent "downshift" into reverse, a reverse button 1A may be provided which button must be depressed prior to the central processing unit interpreting a backward movement of the control lever 1 when in the neutral position as a request for reverse operation.

Upshifts and/or downshifts involving both the main and auxiliary section, i.e. compound shifts, are equally simple for the driver to achieve as are those involving only the auxiliary section, i.e. a split shift. In those transmissions provided with multiple reverse gear ratios, the transmission may be downshifted into lower reverse ratios and upshifted into higher reverse ratios by movement of the control lever backward and forward as indicated. Of course, any type of toggle switch or button which may be located on the end of the shift lever may be utilized in place of reverse enable button 1A.

It is understood that a single control lever moveable forward and backward in a given direction to select a forward and reverse mode of operation, and then moveable in a transverse direction to select upshifts and downshifts either single or multiple, of the type disclosed in U.S. Pat. No. 4,442,730, the disclosure of which is hereby incorporated by reference, may be substituted for the control lever 1 illustrated.

It is another important and advantageous feature of the semi-automatic control system of the present invention that, whenever the vehicle is brought to a complete stop, the clutch 16 is disengaged and the transmission is engaged in a relatively high gear ratio and the lever 1 is moved in the downshift direction once, the control will automatically shift transmission 12 to a preselected starting gear, or neutral, which may involve skip-shifting over a large plurality of intervening gear ratios. By way of example, in a twelve forward speed transmission, the permissible starting ratios may be the first through fifth gear. Once in a start ratio, a lever movement in the downshift direction will the shift the transmission one ratio lower and another movement in the upshift direction will shift the transmission one ratio higher. The operator, at rest or in motion, can always select a gear ratio from those permitted. The manual clutch pedal, if utilized, is only intended for use preparatory to stopping to disengage the transmission and avoid stalling and during starting from rest in any of the permissible starting gear ratios.

Figure 4:
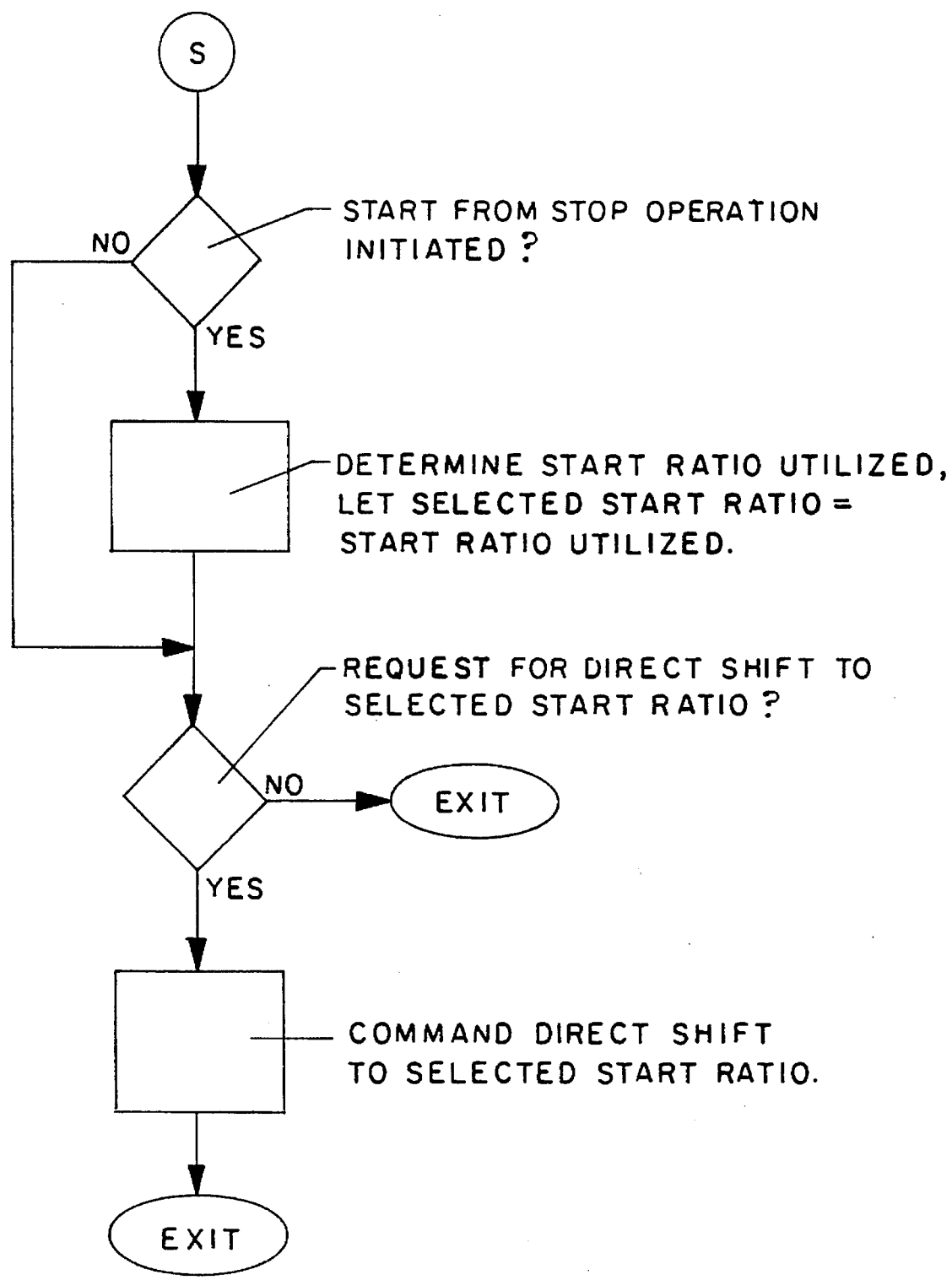
FIG. 4 is a schematic illustration, in the form of a flow chart, of the control system/method of the present invention.

According to the present invention, as illustrated in FIG. 4, if the 55 operator allows the vehicle ground speed to fall below a reference value (usually at or almost a full stop), and the master clutch 16 is manually or automatically disengaged, a single movement or pulse of lever 1 in the downshift direction from a gear ratio higher than an allowable starting gear will be interpreted as a request for automatic selection and direct engagement of either transmission neutral or a preselected start ratio. Under similar conditions, a single movement or pulse of lever 1 in the upshift direction from neutral will be interpreted as a request for automatic selection and direct engagement of the preselected start ratio. When in the range of allowable start gear ratios (usually first through fifth for a twelve speed, first through seventh for an eighteen speed transmission) a single movement or pulse in the up or downshift direction will be interpreted as a request for a single up or downshift, respectively.

A single movement or pulse of the lever is a movement of the lever from the centered position to a displaced position, in either the upshift or downshift direction, and then the immediate release of the lever allowing the lever to return to the centered position thereof. If the control lever 1 is retained in the displaced position for more than a predetermined period of time (for example, for more than one or two seconds), an alternate control logic may be utilized.

In the prior art transmission systems, the predetermined/preselected start gear was a preset fixed ratio or a ratio determined by the electronic control unit in view of sensed system parameters and predetermined logic rules. The preselected ratio was often different from the specific start ratio desired by the operator on the basis of his knowledge of vehicle loading, operating terrain, traffic conditions, weather conditions and the like.

In accordance with the present invention, as illustrated in FIG. 4, during each vehicle start from stop operation, the central processing unit senses the actual ratio utilized and memorizes this ratio as the preselected start ratio. Thereafter, if the operator should select a shift to the preselected start ratio, the controller will cause the transmission to be shifted directly to the currently memorized preselect start ratio which is the last ratio actually used in a vehicle start from stop operation.

By this control strategy, the present value for the preselected start ratio always reflects the vehicle operator's latest indication of a most desirable start from stop ratio.

Although the preferred embodiment of the present invention has been described with a certain degree of particularity, various changes to form and detail may be made without departing from the spirit and scope of the invention as hereinafter claimed.

We claim:

1. A method of controlling an automated mechanical change gear transmission system (10) comprising a fuel throttle control (24), a fuel throttle controlled engine (14), a multi-speed change gear mechanical transmission (12) having a lowest grouping of gear ratios (1st–5th) each suitable for start from stop operation and having a specific ratio within said lowest grouping of ratios determined to be a predetermined start ratio, a manually operated shift selection level (1), a central processing unit (38) for receiving inputs and for processing same according to predetermined logic rules to issue command output signals to non-manually controlled operators including a transmission operation (34), said processing unit sensing operation of said manual shift selection lever and system parameters indicative of selection of a shift directly into the predetermined start ratio, said method comprising:

(i) sensing an actual gear ratio utilized during each start from stop operation; and (ii) memorizing the actual gear ratio utilized during each start from stop operation as the current predetermined start ratio.

2. A system of controlling an automated mechanical change gear transmission system (10) comprising a fuel throttle control (24), a fuel throttle controlled engine (14), a multi-speed change gear mechanical transmission (12) having a lowest grouping of gear ratios (1st–5th) each suitable for start from stop operation and having a specific ratio within said lowest grouping of ratios determined to be a predetermined start ratio, a manually operated shift selection lever (1), a central processing unit (38) for receiving inputs and for processing same according to predetermined logic rules to issue command output signals to non-manually controlled operators including a transmission operator (34), said processing unit sensing operation of said manual shift selection lever and system parameters to sense selection of a shift directly into the predetermined start ratio, said system comprising:

(i) means for sensing an actual gear ratio utilized during each start from stop operation; and (ii) means for memorizing the actual gear ratio utilized during each start from stop operation as the current predetermined start ratio.

3. A method of controlling a semi-automatic mechanical change gear transmission system (10) comprising a fuel throttle control (24), a fuel throttle controlled engine (14), a multi-speed change gear mechanical transmission (12) having a lowest grouping of gear ratios (1st–5th) each suitable for start from stop operation and having a specific ratio within said lowest grouping of ratios determined to be a predetermined start ratio, a manually operated shift selection level (1), a central processing unit (38) for receiving inputs and for processing same according to predetermined logic rules to issue command output signals to non-manually controlled operators including a transmission operator (34), said processing unit sensing operation of said manual shoft selection lever and system parameters to sense operator selection of a shift directly into the predetermined start ratio, said method comprising:

(i) sensing an actual gear ratio utilized during each start from stop operation; and (ii) memorizing the actual gear ratio utilized during each start from stop operation as the current predetermined start ratio.

4. A system of controlling an automated mechanical change gear transmission system (10) comprising a manual fuel throttle control (24), a fuel throttle controlled engine (14), a multi-speed change gear mechanical transmission (12) having a lowest grouping of gear ratios (1st–5th) each suitable for start from stop operation and having a specific ratio within said lowest grouping of ratios determined to be a predetermined start ratio, a manually operated shift selection lever (1), a central processing unit (38) for receiving inputs and for processing same according to predetermined logic rules to issue command output signals to non-manually controlled operators including a transmission operator (34), said processing unit sensing operation of said manual shift selection lever and system parameters to sense operator selection of a shift directly into the predetermined start ratio, said system comprising:

(i) means for sensing an actual gear ratio utilized during each start from stop operation; and (ii) means for memorizing the actual gear ratio utilized during each start from stop operation as the current predetermined start ratio.

* * * * *